United States Patent
Murakami

[11] Patent Number: 6,160,867
[45] Date of Patent: Dec. 12, 2000

[54] MULTI-LAYER X-RAY-REFLECTING MIRRORS WITH REDUCED INTERNAL STRESS

[75] Inventor: Katsuhiko Murakami, Kawasaki, Japan

[73] Assignee: Nikon Corporation, Tokyo, Japan

[21] Appl. No.: 09/115,567

[22] Filed: Jul. 14, 1998

[30] Foreign Application Priority Data

Jul. 17, 1997 [JP] Japan ................................... 9-192639

[51] Int. Cl.[7] ..................................................... G21K 1/06
[52] U.S. Cl. .............................. 378/84; 378/85; 378/145
[58] Field of Search ................................. 378/84, 85, 145

[56] References Cited

U.S. PATENT DOCUMENTS

| | | | |
|---|---|---|---|
| 4,446,194 | 5/1984 | Candelaria et al. | 428/428 |
| 5,188,706 | 2/1993 | Hori et al. | 216/12 |
| 5,265,143 | 11/1993 | Early et al. | 378/84 |
| 5,357,899 | 10/1994 | Bassous et al. | 117/4 |
| 5,433,988 | 7/1995 | Fukuda et al. | 428/141 |

OTHER PUBLICATIONS

Hirayama et al., Appl. Phys. Lett. 52, 1335 (1998).

*Primary Examiner*—David P. Porta
*Assistant Examiner*—Allen C Ho
*Attorney, Agent, or Firm*—Klarquist Sparkman Campbell Leigh & Whinston, LLP

[57] ABSTRACT

X-ray-reflecting mirrors are disclosed that exhibit reduced internal stress without any significant reduction in reflectance to X-rays. The mirrors comprise a substrate on a surface of which a multi-layer structure is formed. The multi-layer structure is formed by alternately and superposedly layering, on a surface of the substrate, a first material (e.g., molybdenum) and a second material (silicon with a dopant such as boron). Net internal stress of the multi-layer structure is controllably reduced by controlling the amount of diffused dopant in the second material.

21 Claims, 2 Drawing Sheets

MULTI-LAYER X-RAY-REFLECTING MIRRORS WITH REDUCED INTERNAL STRESS

FIELD OF THE INVENTION

This invention pertains to X-ray reflecting mirrors, especially such mirrors used for reflecting "soft" X-rays.

BACKGROUND OF THE INVENTION

The complex index of refraction of substances with respect to X-rays is normally expressed as n=1−δ−i k (where δ and k are real numbers). The values of δ and k are usually extremely small compared to 1, and the imaginary part k of the refractive index expresses X-ray absorption by the substance. For this reason, lenses made for refraction of, for example, visible light normally cannot be used for refracting X-rays. Also, because δ and k are extremely small, surface reflectance of the substance is extremely low.

Certain X-ray-reflecting surfaces comprise a large number of layers of substances exhibiting as high an interface-amplitude reflectance as possible. The thickness of each layer can be adjusted according to optical interference theory. The number of layers can be, e.g., in the hundreds, with matching of the phase of each reflected wave. Such a reflective surface can be made by alternately layering, on a suitable substrate, a substance exhibiting a refractive index for the X-ray wavelength used that is not significantly different from the refractive index (unity) of a vacuum, and a substance exhibiting a refractive index that is significantly different from unity.

Conventional membranes used in multi-layer X-ray-reflecting mirrors include W/C (tungsten/carbon), Mo/C (molybdenum/carbon), and Mo/Si (molybdenum/silicon). Such layers can be formed using techniques for forming thin films such as sputtering, vacuum evaporation, and CVD (chemical vapor deposition).

The availability of multi-layer reflecting mirrors that can reflect X-rays incident to the mirror at a zero angle of incidence allows an X-ray optical system to be made that exhibits less aberration than exhibited by systems in which the X-rays are incident on reflective surfaces at a highly skewed angle of incidence (e.g., at angles of incidence resulting in total reflection).

A multi-layer X-ray-reflecting mirror normally exhibits a wavelength selectivity, in which X-rays are reflected strongly only when the Bragg formula is satisfied: 2d sin θ=n λ, where d is the period length of the multiple layers, θ is the angle of incidence, and λ is the wavelength of the X-ray.

Among such multi-layer reflective surfaces, certain Mo/Si multi-layer structures exhibit a high reflectance for X-rays on the long-wavelength side of silicon L absorption edges (λ=12.6 nm).

Grazing incidence mirrors can also be used as reflecting optical elements for X-rays. A grazing incidence mirror has a high reflectivity only at a small grazing angle smaller than a critical angle $θ^c$ (for λ=10 nm, the critical angle $θ^3$ is about 20° or less). Such mirrors cannot be used in situations of near normal incidence. A multilayer mirror can be used at any incidence angle including normal incidence. Windt and Waskiewicz, "Multilayer Facilities Required for Extreme-Ultraviolet Lithography," *J. Vac. Sci. Technol.* B12(6):3826 (1994).

Such X-ray mirrors are conventionally used in X-ray telescopes and X-ray laser resonators. X-ray-reflecting mirrors comprising multiple Mo/Si layers have potential uses in reduction projection-lithography systems that utilize "soft" X-rays (i.e., X-rays of relatively long wavelength, low energy, and little penetrative power).

Mo/Si multi-layer reflecting mirrors exhibiting high reflectance for X-rays are conventionally made using a sputtering technique involving a plasma. Unfortunately, thin films made by sputtering generally exhibit internal stresses arising from compression. Such stresses are typically caused by a "peening" effect of high-speed particles (positive ions and neutral particles) in the plasma, as described in Kinbara, *Sputtering Phenomena*, Tokyo University Press, 1984.

A multi-layer mirror structure having internal stress typically exhibits substantial warping of the reflective surface. Such warping generates wave-surface aberrations in optical systems comprising such mirrors; such aberrations significantly degrade the optical performance of such systems.

Various techniques have been evaluated to reduce the internal stress in Mo/Si multi-layer membranes. For example, certain stresses apparently can be controlled by varying the thickness ratios of the molybdenum and silicon layers. Nguyen et al., *OSA Proceedings On Extreme Ultra-violet Lithography*, Vol. 23, p. 56, 1995. Another approach is to change the bias voltage on the substrate during formation of the layers by sputtering. Nakajima et al., *Vacuum* 37(1): 10–16, 1994. Yet another approach is to vary the applied high-frequency electrical power when applying the layers. Haga et al., 57th *Applied Physics Conference Scientific Lecture Meeting*, Abstract 7p-W-1, p. 495 (1996). Yet another approach is to impose a heat stress to the structure by elevating the temperature of the substrate when applying the layers. Wasa et al., 56th *Applied Physics Conference Scientific Lecture Meeting*, Abstract 26a-C-5, p. 491 (1995). Unfortunately, application of such techniques provides no real understanding of the true origin of the stresses and how they can be reliably controlled. Thus, whether or not stresses are present in a particular X-ray mirror is unpredictable, and attempts to reduce the stress after manufacture can lead to unexpected and unwanted consequences such as loss of reflectance.

SUMMARY OF THE INVENTION

This invention was developed with the aforementioned types of problems in mind and aims to provide multi-layer X-ray-reflecting mirrors having reduced internal stress without exhibiting a reduced reflectivity.

According to one aspect of the invention, mirrors are provided for reflecting X-rays. A preferred embodiment of such a mirror comprises a substrate having a surface, and multiple alternating layers of a first material and a second material on the substrate. The first material consists essentially of a substance selected from the group consisting of Mo, Rh, Ru, Re, W, Ta, Ni, Cr, Al, and alloys of such substances. Molybdenum is preferred, especially if the mirror structure is destined for use with X-rays having a wavelength of 13 nm. The second material consists essentially of silicon (as a principal constituent) and a dopant, selected from a group consisting of B, C, and P, diffused into the silicon. The preferred dopant is B. The dopant is at a concentration that is sufficient to reduce the net internal stress in the multi-layer structure compared to an otherwise similar multi-layer structure lacking the dopant in the second material. The dopant is preferably at a concentration of at least $1 \times 10^{18}$ atoms/cm$^3$. The substrate is preferably glass but can be synthetic quartz or other suitable rigid material. The number of layers can generally be about 30 to 100, preferably at least 50, with the topmost layer preferably being of the second material.

According to another aspect of the invention, methods are provided for making a mirror that is reflective to X-rays. According to a preferred embodiment, a first step comprises providing a rigid substrate (preferably glass, but any of various other rigid substrates conventionally used to support thin films may be suitable). To a surface of the substrate is applied a laminar structure consisting of a layer of a first material and a layer of a second material. The first material consists essentially of a substance selected from a group consisting of Mo, Rh, Ru, Re, W, Ta, Ni, Cr, Al, and alloys of such substances. (Mo is preferred especially if the wavelength with which the mirror structure is to be used is about 13 nm.) The second material consists essentially of silicon and a dopant, diffused into the silicon, that is selected from a group consisting of B, C, and P. The dopant is preferably at a concentration of at least 0.001 atomic percent relative to the silicon. Either the layer of the first material or the layer of the second material can be the layer actually contacting the surface of the substrate. At least one additional layer of each of the first and second materials are applied superposedly to the laminar structure. The additional layers are applied in alternating order to form a multi-layer mirror structure.

The preferred dopant is boron, preferably at a concentration in the silicon of at least $1 \times 10^{18}$ atoms/cm$^3$. The number of layers in the multi-layer mirror structure is preferably in a range of 30–100 or, alternatively, at least 50. The layers are preferably applied using a sputtering technique; the topmost layer is preferably a layer of the first material.

The foregoing and additional features and advantages of the present invention will be more readily apparent from the following detailed description, which proceeds with reference to the accompanying drawings.

DETAILED DESCRIPTION

An X-ray-reflecting mirror according to a preferred embodiment of the invention comprises, on a suitable rigid substrate, layers of a first material and layers of a second material in alternating sequence in superposed fashion. Most preferably, each layer of the first material consists essentially of molybdenum (Mo), and each layer of the second material consists essentially of silicon (Si) as the principal constituent, with a dopant (preferably boron (B)) diffused into the silicon. By adjusting the dopant concentration in the silicon, the internal stress of the multi-layer reflective mirror can be controlled and minimized, compared to conventional multi-layer X-ray-reflecting mirrors, without having to rely on altering fabrication conditions and without reducing the reflectance of the mirror.

The manner in which internal stress is understood to be controlled is as follows. When atoms diffuse into a crystalline substance, such diffusion can be of two types: "replacement diffusion" in which the diffusing atoms replace atoms of the substance at any of various lattice-point positions of the crystal lattice of the substance; and "penetration diffusion" in which the diffusing atoms penetrate between crystal-lattice positions of the substance. The type of substance into which the diffusion is occurring determines which will occur.

For example, boron and certain other elements undergo replacement diffusion in silicon. The radius of a silicon atom is 1.17 Å, while the radius of a boron atom, as a representative dopant atom, is 0.88 Å. Gilifalco, *Atomic Diffusion in Crystals*, Kyoritsu Publishing Co., 1980. I.e., the radius of a boron atom is only 75% the radius of a silicon atom; if a boron atom is inserted into a lattice point in a silicon crystal, the surrounding silicon atoms experience a tensile stress. As a result, the silicon crystal in general acquires a tensile stress. Tensile stress generated in this fashion increases as the boron concentration in the silicon is increased. For example, if $10^{20}$ atoms/cm$^3$ of boron (approximately 0.1 atomic %) are introduced into monocrystalline Si, a tensile stress of about 100 MPa can be generated in the crystal.

In a Mo/Si multi-layer mirror structure made using a sputtering technique, the molybdenum layers and the silicon layers have a compression stress due to the "peening" effect discussed above. The degree of such internal stress throughout the Mo/Si multi-layer mirror structure is dependent upon the conditions under which the layers were formed; in general, such stress is in the range of several tens of MPa to several hundreds of MPa.

Figure 1:
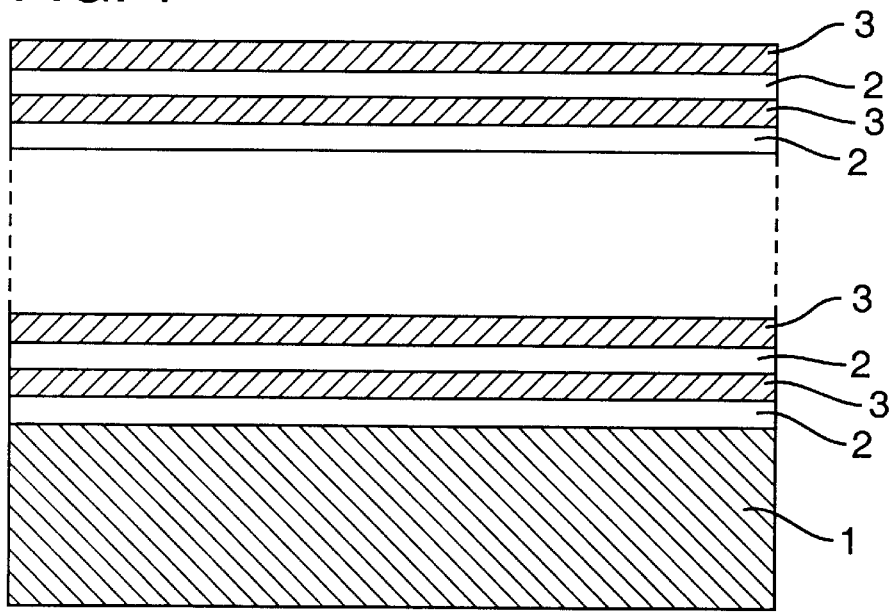
FIG. 1 is a schematic elevational section of a Mo/Si multi-layer X-ray mirror according to the invention.

A representative multi-layer mirror structure according to the invention is shown in FIG. 1. A rigid substrate preferably made of glass or, alternatively, synthetic quartz ((e.g., "Zerodur" made by Schott or "ULE" made by Corning), or SiC, is provided with a mirror-polished surface. The substrate thickness is not critical so long as it has sufficient mechanical rigidity, stiffness, or stability. For example, a silicon substrate can have a thickness of 0.5 mm. Greater precision may require greater thickness, e.g., a thickness of ½, ⅓, or ¼ the diameter of the substrate.

In one representative embodiment, a layer 2 of a first material, preferably consisting essentially of molybdenum (Mo) (Mo is especially preferred for λ=13 nm), is applied to the mirror-polished surface. As an alternative to Mo, the first material can consist essentially of Rh, Ru, Re, W, Ta, Ni, Cr, or Al, or any of various alloys of these materials.

A layer 3 of a second material is applied superposedly to the first layer 2. The second material consists essentially of silicon (Si), as a principal ingredient, and a dopant. The dopant is preferably boron, but carbon or phosphorus can be used alternatively as the dopant.

As an alternative to starting with the layer 2 of the first material on the substrate surface, it is possible to start with the layer 3 of the second material.

In any event, additional first and second layers 2, 3 are superposedly applied in alternating sequence until the desired number of layers of the resulting multi-layer mirror structure has been formed. The number of layers is preferably in the range of 30–100, and most preferably about 50. Each of the layers 2, 3 is typically applied using any of various sputtering techniques, in which the "peening" effect becomes manifest (the peening effect generates a compression stress in the resulting structure). As an alternative to sputtering, vacuum evaporation can be used.

The dopant is introduced into each of the silicon layers 3 by replacement diffusion (replacement diffusion of, e.g., boron into crystalline silicon generates a tensile stress in the resulting structure). The tensile stress effectively offsets the compression stress imparted by sputtering to produce a substantially lower net stress in the structure.

The tensile stress of the silicon layers increases as the dopant concentration in such layers increases. As a result, the net internal stress (i.e., the sum of the compression stress and tensile stress) of the multi-layer structure can be readily controlled and manipulated simply by adjusting the dopant concentration.

Figure 2:
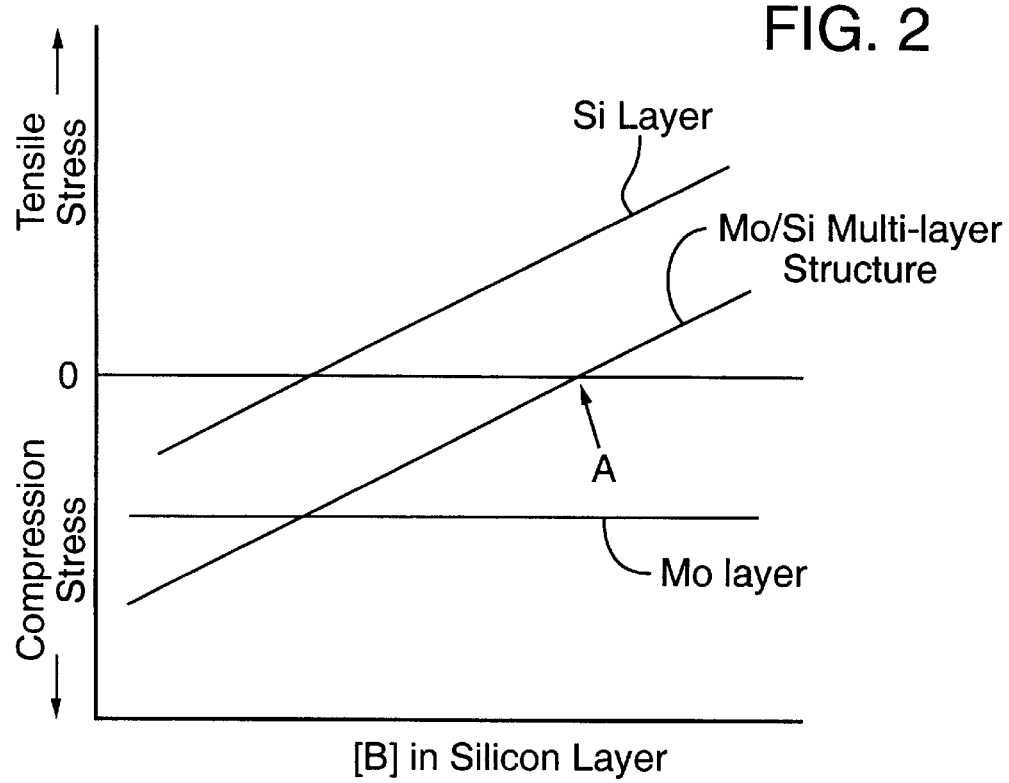
FIG. 2 is a plot of net internal stress in a Mo/Si multi-layer mirror, according to the invention, as a function of boron concentration in the silicon layers of the structure.

FIG. 2 is a representative plot illustrating how the net internal stress in a Mo/Si multi-layer mirror structure (in this example, made with alternating layers of molybdenum as the first material and B-doped silicon as the second material applied by sputtering) can be reduced to zero. In FIG. 2, the abscissa is boron concentration in the silicon layers and the ordinate is net internal stress of the structure. Each molybdenum layer has substantially the same compression stress because, preferably, each molybdenum layer has the same thickness and was preferably applied using the same technique (e.g., sputtering) under similar conditions. The internal stress of the silicon layers changes from compression stress to tensile stress as the boron concentration increases in the silicon layers. At point A in FIG. 2, the total compression stress of the molybdenum layers and the total tensile stress of the silicon layers are equal and thus cancel each other in the overall structure. Thus, the net internal stress throughout the multi-layer structure is zero.

In a multi-layer mirror structure according to this invention, the dopant concentration in the silicon layers is preferably $1 \times 10^{18}$ atoms/cm$^3$ (equal to 0.002 atomic %) or higher so as to provide a substantial reduction of the compression internal stress of the structure. The concentration of dopant is preferably the same in all the silicon layers.

The thickness of each layer of the first material is not necessarily equal to the thickness of each layer of the second material, but the thickness of each layer of the first material is preferably the same. In any event, when the product of the "internal stress" and the "layer thickness" for the layers of the first material is equal to such a product for the layers of the second material, the internal stress of the multi-layer structure is zero.

Figure 3:
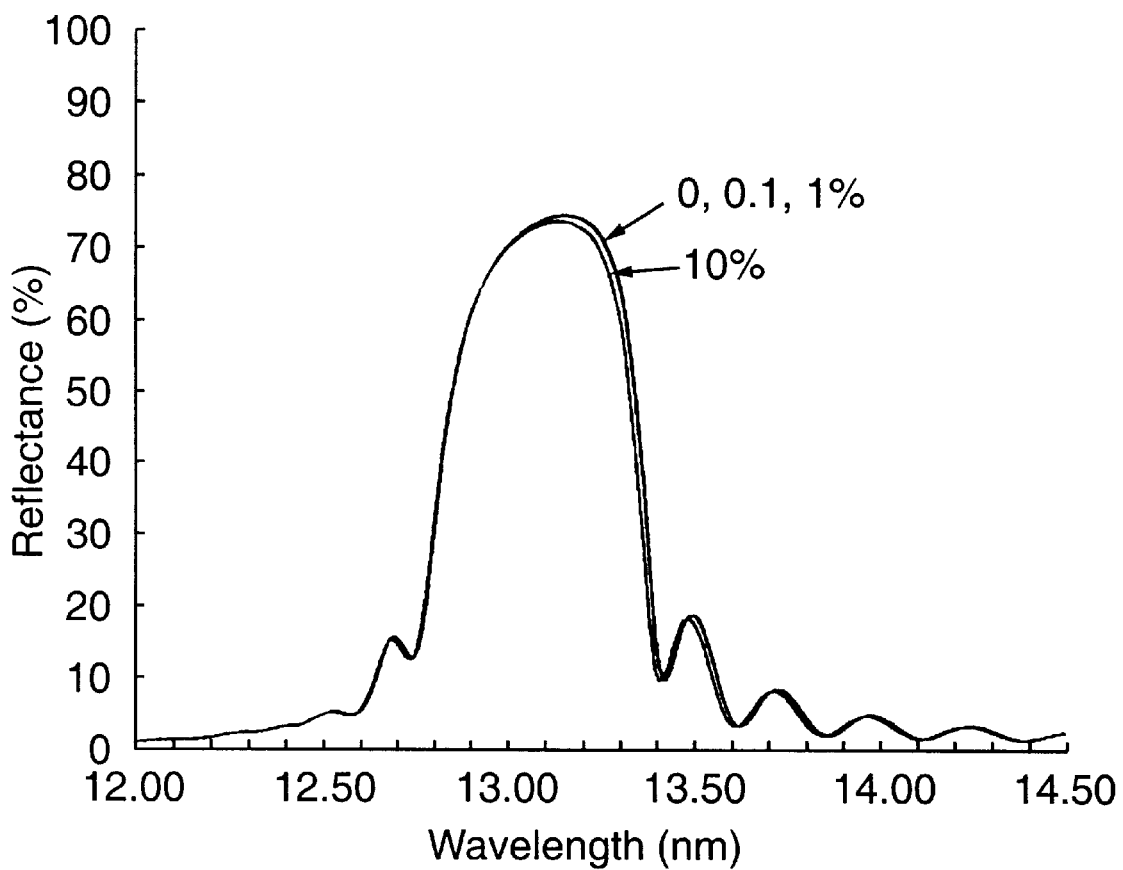
FIG. 3 is a plot of soft X-ray reflectance by a Mo/Si multi-layer mirror according to the invention.

Introduction of dopant into the silicon (e.g., doping the silicon with boron) causes a change in the complex refractive index of the silicon. According to conventional wisdom, such a change would be expected to produce a significant decline in reflectance. However, as exemplified in FIG. 3, the introduction of boron into the silicon layers of the multi-layer structure causes substantially no loss of reflectance. Specifically, FIG. 3 depicts a representative reflectance (when the incident X-ray has a zero angle of incidence) from a Mo/Si multi-layer mirror structure comprising 50 layer pairs. Each layer of the first material in the FIG. 3 example has a thickness of 2.2 nm and each layer of the second material has a thickness of 4.5 nm.

In the case of normal incidence, the condition for high reflectance is 2d =λ. The wavelength deviation Δλ from λ at which maximal reflectance is obtained is determined from the deviation Δd of the thickness d of a layer according to the following: $\Delta\lambda/\lambda = \Delta d/d = \Delta d(Si)/d(Si) = \Delta d(Mo)/d(Mo)$. Δd(Si) and Δd(Mo) can be determined from the magnitude of deviation of the wavelength at which maximum reflectance is obtained, and from the magnitude of the change of reflectance at the wavelength λ that is tolerable.

FIG. 3 depicts curves obtained in the following four examples: (a) a multi-layer structure in which the silicon layers contain no boron, (b) a multi-layer structure in which the silicon layers contain 0.1 atomic % boron, (c) a multi-layer layer structure in which the silicon layers contain 1.0 atomic % boron, and (d) a multi-layer structure in which the silicon layers contain 10 atomic % boron.

Peak wavelengths and reflectances for each of these four examples are listed below.

| Boron Concentration | Peak Wavelength | Reflectance |
|---|---|---|
| 0 at % | 131.6 Å | 74.3% |
| 0.1 at % | 131.6 Å | 74.3% |
| 1 at % | 131.6 Å | 74.2% |
| 10 at % | 131.4 Å | 73.4% |

Hence, introduction of boron (as a representative dopant) into the silicon layers of a multi-layer mirror structure according to the invention causes essentially no decline in reflectance.

As an alternative to molybdenum as a first material, any of various other materials can be used such as Rh, Re, W, Ta, Ni, Cr, Al, and alloys of such materials.

The invention will be better understood by reference to the following example embodiments, which are intended to merely illustrate the best mode now known for practicing the invention. The scope of the invention is not to be considered limited to these example embodiments.

EXAMPLE EMBODIMENT 1

A multi-layer mirror structure according to this example embodiment was formed using an ion-beam sputtering technique. Specifically, for forming the layers of the first material and the layers of the second material, a molybdenum (Mo) sputtering target and a silicon (Si) sputtering target, respectively, were used. The Si target had a boron (B) concentration of 0.5 atomic %. The resulting multi-layer mirror structure was formed by alternately layering the Mo layers 2 and the B-diffused Si layers 3 onto a mirror-polished surface of a glass substrate 1 (FIG. 1).

The period length of the multi-layer mirror structure was 6.7 nm (the thickness of each Mo layer was 4.5 nm and the thickness of each Si layer was 2.2 nm). Fifty pairs of layers were applied to the substrate.

For comparison, a Mo target and a Si target containing no boron were used to make, using an ion-beam sputtering technique, a "control" multi-layer mirror structure having the same period length, layer thicknesses, and number of layers as the example embodiment.

The net internal stresses of the example embodiment and of the control were calculated, using conventional methods, from measured substrate warping (bending) before and after the formation of the fifty pairs of layers. The calculations can be performed in at least two ways: (a) sum up all the Fresnel coefficients of each interlayer boundary as an interference effect; or (b) perform a matrix analysis as described in Born and Wolf, *Principles of Optics*, 5$^{th}$ edition, pp. 51–70, Pergamon Press, 1975, incorporated herein by reference. The net internal stress of the control was approximately 300 MPa of compression stress. The net internal stress of the example embodiment was approximately 10 MPa of tensile stress.

This example embodiment exhibited reflectance behavior as profiled in FIG. 3. Thus, this example embodiment exhibited a substantial reduction of internal stress without a decline in reflectance.

EXAMPLE EMBODIMENT 2

A multi-layer mirror structure according to this example embodiment was made using a high-frequency magnetron sputtering technique. To make each layer of the first material, a Mo sputtering target was used; to make each layer of the second material, a Si sputtering target having a boron (B) concentration of 0.4 atomic % was used. The Mo layers 2 and the B-doped Si layers 3 were alternately applied to a mirror-polished surface of a glass substrate 1 (FIG. 1). The period length was 6.7 nm (the thickness of each Mo layer was 4.5 nm and the thickness of each Si layer was 2.2 nm), and 50 pairs of layers were applied.

As a control, an otherwise similar multi-layer mirror structure was formed using the same technique but in which the Si layers contained no boron. The control had the same periodic length, layer thicknesses, and number of layers as the example embodiment.

The net internal stresses of each multi-layer mirror structure were calculated from measured warping (bending) of the substrate before and after the layers were applied. The net internal stress of the control was approximately 300 MPa of compression stress, and the net internal stress of the example embodiment was approximately 5 MPa of tensile stress.

This example embodiment exhibited a reflectance profile as shown in FIG. 3. Thus, this example embodiment exhibited a substantially reduced net internal stress without a significant decline in reflectance.

EXAMPLE EMBODIMENT 3

A multi-layer mirror structure according to this example embodiment was formed using an ion-beam sputtering technique. To make each layer of the first material, sputtering was performed using a Mo sputtering target. To make each layer of the second material, sputtering was performed using a compound sputtering target. The compound sputtering target comprised Si extending over a portion of a boron target surface, wherein the surface-area ratio of boron (B) to Si on the target surface was 1:5. The multi-layer mirror structure was formed by alternately layering Mo layers 2 and B-doped Si layers 3 on a mirror-polished surface of a glass substrate 1 (FIG. 1).

The period length of the multi-layer mirror structure was 6.7 nm (the thickness of each molybdenum layer was 4.5 nm and the thickness of each silicon layer was 2.2 nm). Fifty pairs of layers were applied.

For comparison, a "control" structure comprising alternating layers of Mo and Si (without any boron) was formed using the same sputtering technique. The control had the same period length, layer thicknesses and number of layers as the example embodiment.

The net internal stresses of the example embodiment and of the control were determined from measurements of warping (bending) of the substrate before and after forming the layers on the substrate. The net internal stress of the control was approximately 300 MPa of compression stress, and the net internal stress of the example embodiment was approximately 10 MPa of tensile stress.

This example embodiment exhibited a reflectance profile as shown in FIG. 3. Thus, this example embodiment exhibited a substantial reduction of net internal stress without a significant decline in reflectance.

EXAMPLE EMBODIMENT 4

A multi-layer mirror structure according to this example embodiment was made using a high-frequency magnetron sputtering technique. To make each layer of the first material, sputtering using a Mo sputtering target was performed. To make each layer of the second material, sputtering using a compound sputtering target was performed. The compound sputtering target comprised a Si wafer extending over a portion of a boron (B) target surface, wherein the ratio of B-to-Si surface area on the target surface was 1:6. The multi-layer mirror structure was formed by alternately layering Mo layers 2 and B-doped Si layers 3 onto a mirror-polished surface of a glass substrate 1 (FIG. 1).

The period length of this example embodiment was 6.7 nm (the thickness of each Mo layer was 4.5 nm, and the thickness of each Si layer was 2.2 nm). Fifty pairs of layers were formed.

For comparison, a "control" structure was formed using the same sputtering technique, except that the Si layers contained no boron. The control had the same period length, layer thicknesses, and number of layers as the example embodiment.

The net internal stresses of the control and of the example embodiment were calculated from measurements of warping (bending) of the substrate before and after application of the layers. The net internal stress of the control was approximately 300 MPa of compression stress, but the net internal stress of the example embodiment was approximately 5 MPa of tensile stress.

This example embodiment exhibited a reflectance profile as shown in FIG. 3. Thus, this example embodiment exhibited a substantially reduced internal stress without a significant decline in reflectance.

Each of the example embodiments exhibited a reduced net internal stress, compared to controls lacking dopant in the silicon layers, that was independent of the technique used to form the multi-layer mirror structure. The example embodiments also demonstrated that the net internal stress of a multi-layer mirror structure according to the present invention can be freely controlled by manipulating the concentration of dopant in the silicon layers. For example, an otherwise substantial net compression stress can be eliminated entirely or converted to a slight net tensile stress. This allows excellent control over warping of the structure due to excessive internal stress, with a consequent remarkable improvement in optical performance of the multi-layer mirror structure.

Whereas the invention has been described in connection with a preferred embodiment and multiple example embodiments, it will be understood that the invention is not limited to those embodiments. On the contrary, the invention is intended to encompass all modifications, alternatives, and equivalents as may be encompassed within the spirit and scope of the invention as defined by the appended claims.

What is claimed is:

1. A mirror for reflecting X-rays, comprising:
   a substrate having a surface; and
   multiple alternating layers of a first material and a second material applied superposedly to the surface of the substrate to form a multi-layer structure on the substrate, the first material consisting essentially of a substance selected from a group consisting of Mo, Rh, Ru, Re, W, Ta, Ni, Cr, Al, and alloys of such substances, and the second material consisting essentially of silicon and a dopant selected from a group consisting of B, C, and P, the dopant being at a concentration sufficient to reduce net internal stress in the multi-layer structure compared to an otherwise similar multi-layer structure lacking the dopant in the second material.

2. A mirror for reflecting X-rays, comprising:
   a substrate having a surface; and
   multiple alternating layers of a first material and a second material applied superposedly to the surface of the substrate to form a multi-layer structure on the substrate, the first material consisting essentially of a substance selected from a group consisting of Mo, Rh, Ru, Re, W, Ta, Ni, Cr, Al, and alloys of such substances, and the second material consisting essentially of silicon and a dopant selected from a group consisting of B, C, and P, the dopant being at a concentration of at least $1 \times 10^8$ atoms/cm$^3$ to reduce net internal stress in the multi-layer structure compared to an otherwise similar multi-layer structure lacking the dopant in the second material.

3. A mirror for reflecting X-rays, comprising:

a substrate having a surface; and multiple alternating layers of a first material and a second material applied superposedly to the surface of the substrate to form a multi-layer structure on the substrate, the first material consisting essentially of a substance selected from a group consisting of Mo, Rh, Ru, Re, W, Ta, Ni, Cr, Al, and alloys of such substances, and the second material consisting essentially of silicon and a dopant selected from a group consisting of B, C, and P, wherein the dopant is B at a concentration of at least $1 \times 10^{18}$ atoms/cm$^3$ that is sufficient to reduce net internal stress in the multi-layer structure compared to an otherwise similar multi-layer structure lacking the dopant in the second material.

4. The mirror of claim 1, wherein the substrate is glass.

5. The mirror of claim 1, comprising at least 50 layers of each of the first and second materials.

6. The mirror of claim 1, comprising 30 to 100 layers.

7. The mirror of claim 1, wherein the first material is Mo, and the second material is B-doped Si.

8. The mirror of claim 1, wherein the layer contacting the surface of the substrate is a layer of the first material.

9. A mirror for reflecting X-rays, comprising:

a substrate having a surface; and multiple alternating layers of a first material and a second material applied superposedly to the surface of the substrate to form a multi-layer structure on the substrate, the first material consisting essentially of a substance selected from a group consisting of Mo, Rh, Ru, Re, W, Ta, Ni, Cr, Al, and alloys of such substances, and the second material consisting essentially of silicon and a dopant selected from a group consisting of B, C, and P, the dopant being at a concentration sufficient to reduce net internal stress in the multi-layer structure compared to an otherwise similar multi-layer structure lacking the dopant in the second material, wherein the layer contacting the surface of the substrate is a layer of the second material.

10. A method for making a mirror that is reflective to X-rays, the method comprising:

(a) providing a rigid substrate having a surface;

(b) applying to the surface a laminar structure consisting of a layer of a first material and a layer of a second material, the first material consisting essentially of a substance selected from a group consisting of Mo, Rh, Ru, Re, W, Ta, Ni, Cr, Al, and alloys of such substances, and the second material consisting essentially of Si and a dopant selected from a group consisting of B, C, and P, the dopant being at a concentration of at least 0.001 atomic percent relative to the silicon;

(c) superposedly applying at least one additional layer of the first material and of the second material in alternating order superposedly to the laminar structure formed in step (b) to form a multi-layer mirror structure.

11. The method of claim 10, wherein, in step (b), a layer of the first material contacts the substrate surface.

12. The method of claim 10, wherein, in step (b), a layer of the second material contacts the substrate surface.

13. The method of claim 10, wherein the dopant in the second material is at a concentration of at least $1 \times 10^{18}$ atoms/cm$^3$.

14. The method of claim 13, wherein the dopant is B.

15. The method of claim 10, wherein the first material consists essentially of Mo, and the dopant is B.

16. The method of claim 10, wherein step (a) comprises providing a glass substrate, and providing the surface with a mirror-polish.

17. The method of claim 10, wherein step (c) comprises applying at least 50 layers of each of the first material and of the second material.

18. The method of claim 10, wherein a total of 30 to 100 layers is applied to the substrate.

19. The method of claim 10, wherein steps (b)–(c) are performed by sputtering.

20. A mirror manufactured according to the method of claim 10.

21. A mirror for reflecting X-rays, comprising:

a substrate having a surface; and multiple alternating layers of a first material and a second material applied superposedly to the surface of the substrate to form a multi-layer structure on the substrate, the first material consisting essentially of a substance selected from a group consisting of Mo, Rh, Ru, Re, W, Ta, Ni, Cr, Al, and alloys of such substances, and the second material consisting essentially of silicon and a dopant selected from a group consisting of B, C, and P, the dopant being at a concentration sufficient to reduce surface warping compared to an otherwise similar multi-layer structure lacking the dopant in the second material.

* * * * *

UNITED STATES PATENT AND TRADEMARK OFFICE
CERTIFICATE OF CORRECTION

PATENT NO.    : 6,160,867
DATED         : December 12, 2000
INVENTOR(S)   : Katsuhiko Murakami It is certified that error appears in the above-identified patent and that said Letters Patent is hereby corrected as shown below:

Column 1,
Line 59, change "angle $\theta^{3}$" to -- $\theta^{c}$ --, as shown in page 2, line 13 of the application.

Column 9,
Line 7, change $1 \times 10^{8}$" to -- $1 \times 10^{18}$ --, as shown in page 1 of the amendment dated 6/14/2000.

Signed and Sealed this

Seventh Day of May, 2002

Attest:

JAMES E. ROGAN
*Director of the United States Patent and Trademark Office*

*Attesting Officer*